Oct. 14, 1930. H. L. STANTON ET AL Re. 17,828
ELECTRICAL CONNECTER
Original Filed Feb. 16, 1926
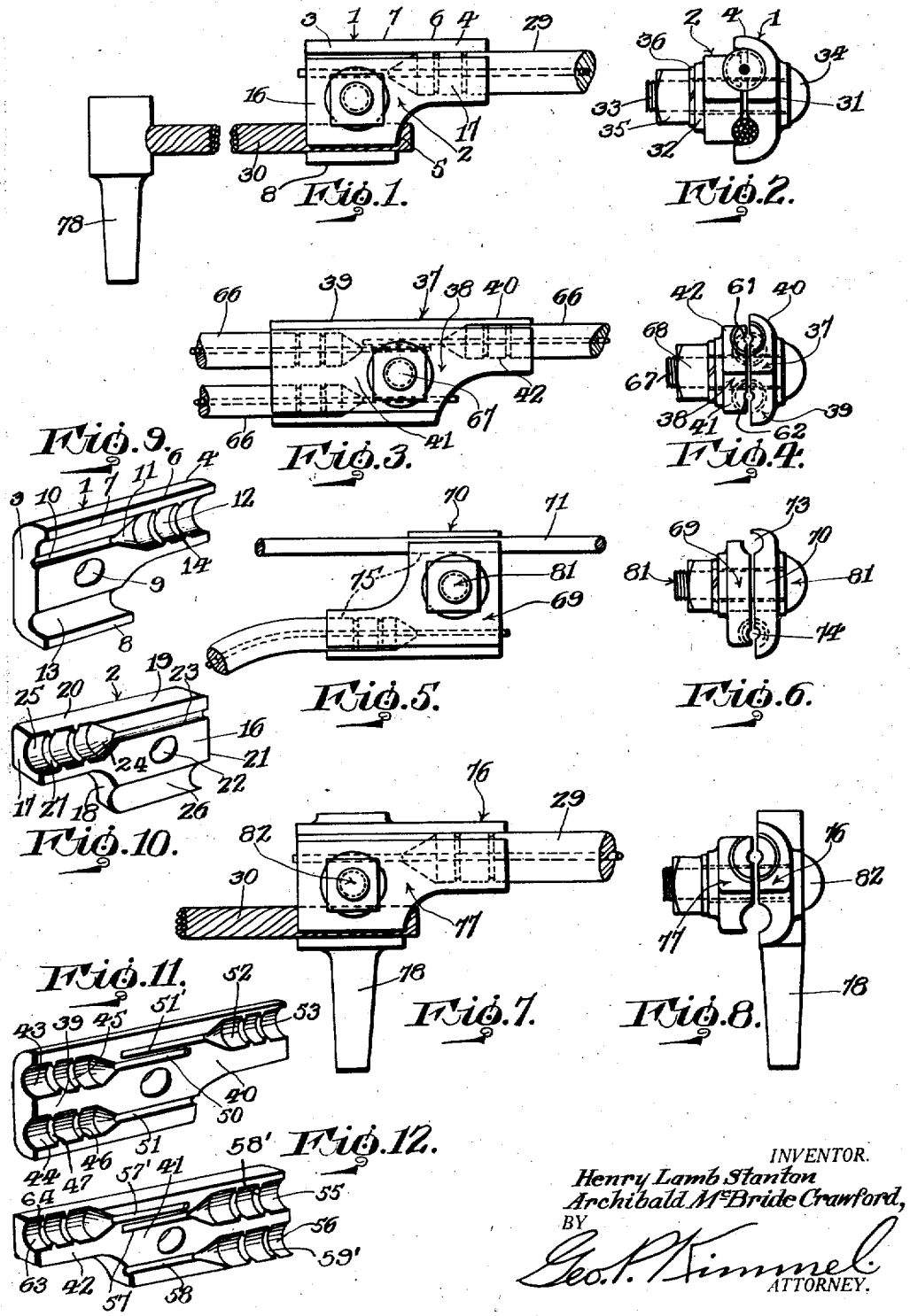
INVENTOR.
Henry Lamb Stanton
Archibald McBride Cranford,
BY
Geo. P. Kimmel
ATTORNEY.

Reissued Oct. 14, 1930

Re. 17,828

UNITED STATES PATENT OFFICE

HENRY LAMB STANTON, OF PITMAN, NEW JERSEY, AND ARCHIBALD McBRIDE CRAWFORD, OF ARDMORE, PENNSYLVANIA

ELECTRICAL CONNECTER

Original No. 1,704,350, dated March 5, 1929, Serial No. 88,582, filed February 16, 1926. Application for reissue filed December 5, 1929. Serial No. 411,959.

This invention relates to electrical connecters and more in particular to connecters used on electric power transmission lines.

The primary object of this invention is to provide a connecter for electric cables whereby the metallic core of the latter, as well as the outer insulation thereof, are properly clamped and supported. Another object of this invention is to provide a connecter whereby wires or cables of different diameters may be readily connected together, or disconnected. Still another object is to provide a connecter adapted to join together continuous lines, or to connect branch lines to a continuous line. Yet another object is to provide a connecter which has all the above named qualities and which is of simple construction, rapid application and which is adapted for cheap quantity manufacture. Additional features and advantages of this invention will appear from the following description considered in connection with the accompanying drawings forming a part of this application, and in which:—

Fig. 1 shows the application of our connecter for connecting together one bare stranded cable and one solid insulated wire.

Fig. 2 is an end view of Fig. 1.

Fig. 3 represents a connecter for connecting three insulated wires together.

Fig. 4 is an end view of Fig. 3, with the wires omitted.

Fig. 5 illustrates the tapping of an overhead line with a connecter of our invention.

Fig. 6 is an end view of Fig. 5, the wires being omitted.

Fig. 7 is a direct rail connecter for connecting a bare stranded wire and a solid insulated wire to a rail.

Fig. 8 is an end view of the connecter shown in Fig. 7.

Figures 9 and 10 are perspective views of the two plates of the connecter of the form shown in Figure 1, looking toward the inner faces of said plates.

Figures 11 and 12 are perspective views of the two plates of the connecter of the form shown in Figure 3, looking towards the inner faces of the plates.

As is well known to those versed in the art, electric cables, when subjected to swaying motions due to wind or other causes, are often broken at the places immediately adjacent either side of the portion of the metallic core of said cable clamped between a connecter; this is due especially to the sudden change in the rigidity of the cable occuring at the points where the insulation has been removed to make the proper engagement with the connecter.

We have found, however, that by making a connecter which is adapted to clamp a certain portion of the insulation, as well as the metallic core, of a cable, the breaking of the latter at points close to the connecter is greatly reduced, if not entirely eliminated. In other words, by clamping the insulation as well as the core, a connection is obtained which offers substantially the same uniform strength as the free portions of the cable.

Referring to Figures 1, 2, 8 and 9, the connecter includes a pair of clamping plates referred to generally at 1, 2 and formed from metal or good electrical conductivity, such as copper or bronze. The plate 1 comprises a wide part 3 and a narrow part 4, the latter providing a lateral continuation of a portion of the end 5 and has its outer side edge 6 flush with the outer side edge 7 of the former. The other side edge of part 3 is indicated at 8. The part 3 is formed with an opening 9 which is intersected by the transverse and longitudinal medians of such part. The inner face of part 3 in proximity to its edge 7 is formed with a groove 10 of semi-circular cross section, of slightly less length than and disposed lengthwise of such part. The groove 10 at its inner end merges into the end of the tapered inner portion 11 of a groove 12 to be hereinafter referred to. The inner face of part 3 adjacent its edge 8 is formed with a groove 13 disposed lengthwise of and coextensive with said part 3. The groove 13 is of semi-circular cross section, but of materially greater width than that of groove 10. The groove 13 is of greater depth than that of groove 10.

The inner face of part 4 is formed with the groove 12 of semi-circular cross section and which has its inner portion tapered as indicated at 11. The inner end or terminus of the tapered portion 11 is formed in the inner face of part 3 where it merges with part 4. The groove 12 is spaced from edge 6 and is of greater width and depth than that of groove 10, but the latter is spaced a greater distance from edge 7 than the distance between groove 12 and edge 6. The groove 10 is positioned to align with the longitudinal center of the groove 12. The wall of groove 12 is formed with spaced ribs 14. The purpose of the ribs 14, as well as the grooves 10, 12 and 13 will be presently referred to.

The plate 2 includes a wide part 16 and a narrow part 17, the latter providing a lateral continuation of a portion of the end 18 and has its longitudinal edge 19 flush with the side edge 20 of the former. The other side edge of part 16 is indicated at 21. The part 16 is formed with an opening 22 which is intersected by the transverse and longitudinal medians of part 16. The opening 22 of part 16 is adapted to align with the opening 9 of part 3. The part 16 is of the same length but of less width than the part 3. The part 17 is of the same length but of less width than part 4. The inner face of part 16 in proximity to its edge 19 is formed with a groove 23 of semi-circular cross section, but of slightly less length than and disposed lengthwise of such part. The groove 23 at its inner end merges into the end of the tapered inner portion 24 of a groove 25 to be hereinafter referred to. The inner face of part 16 is formed with a groove 26 disposed lengthwise of and coextensive with said part 16. The wall of the groove 26 is less than a semi-circle in cross section but of materially greater width than that of groove 23. The groove 26 is of greater depth than that of groove 23.

The inner face of the part 17 is formed with the groove 25 and the wall of the latter is less than a semi-circle in cross section. The groove 25 has its inner portion tapered as indicated at 24. The inner end or terminus of the tapered portion 24 is formed in the inner face of part 16 where it merges with part 17. The groove 23 is of less width and depth than that of groove 25, and is positioned to align with the longitudinal center of groove 25. The groove 25 is of greater length than the length of groove 23. The wall of groove 25 is formed with spaced ribs 27. The purpose of the ribs 27, as well as the grooves 23, 25 and 26 will be presently referred to.

The cross sectional length of the outer side of the wall of groove 23 or that of the groove 25 is less than the cross sectional length of the inner side of such wall. The outer side of the wall of groove 23 merges into the edge 19, the latter being of less width than the edge 28 of part 17. The outer side of the wall of the groove 25 merges into the edge 21 of part 16 and said edge 21 is of less width than edge 20. The outer side of groove 12 projects beyond the outer side of groove 25. The outer side of groove 13 projects beyond the outer side of groove 26. The walls of grooves 12 and 13 are of greater cross sectional length than the cross sectional length of grooves 23, 25 whereby the grooves 12 and 13 enclose the conductors 29, 30 respectively, to a greater extent than the walls of the grooves 25, 26 respectively. This arrangement provides a more satisfactory binding action and for quickly positioning the plates relative to the conductors, than if the walls of the grooves 25, 26 were of the same cross sectional length as that of the grooves 12, 13.

Formed in the outer faces of the parts 3 and 16 are bosses 31, 32 respectively, which surround openings 9 and 22. Extending through the aligning openings 9 and 22 is a threaded bolt 33 having a head 34 bearing against boss 31. The stem of the bolt 33 projects beyond plate 2 and carries a clamping nut 35 which abuts a washer 36 mounted on the bolt stem and bearing against boss 32. The bolt and nut clamp the plates together, whereby the walls of the grooves will tightly bind against the conductors. When the plates are clamped together the part 3 projects beyond the side edges of part 16 and the part 4 projects beyond the outer side edge of part 6.

The grooves 10 and 23 oppose each other. The grooves 12 and 25 oppose each other. The grooves 10 and 23 receive the non-insulated portion of the terminal of electrical conductor 29 and grooves 12 and 25 receive the insulated portion 3 of such terminal. The ribs 14 and 27 enter the insulated portion of such terminal to insure a better hold on the insulation and prevent accidental extraction of the conductor 29 when submitted to excess longitudinal strains. The grooves 13 and 26 coact to receive the conductor, wire or cable 30. The walls of the grooves 10 and 23, 12 and 25, and 13 and 26 coact to bind the conductors to the plates when these latter are clamped together. The manner of setting up the plates of a wide and narrow part reduces the weight of the connecter and economizes in material, reducing the cost of production, at the same time insuring a thorough binding action from the clamping means as the latter is disposed centrally of the wider parts of the plates.

Referring to Figures 3 and 4 of the drawings the connecter includes the pair of apertured plates generally indicated at 37, 38 which are of materially greater length than the plates 1, 2. The wide and narrow parts of plate 37 are indicated at 39, 40 respectively. The wide and narrow parts of plate 38 are indicated at 41, 42 respectively. The wide parts 39, 41 are of the same length, but of greater length than parts 40, 42. The parts 40, 42 are of the same length. The parts 39, 41 are of greater width than parts 40, 42 respectively. The part 39 projects beyond the side edges of part 41. The part 40 projects beyond the outer side edge of part 42. The parts 40, 42 form lateral continuations of a portion of the ends of parts 39, 41 respectively. The inner face of part 39 is provided with a pair of spaced, semicircular grooves 43, 44 arranged in parallelism and the former is provided with spaced ribs 45. The groove 44 is also formed with spaced ribs 47. The grooves 43, 44 are of less length than the length of part 39 and have their outer ends terminate at that end of part 39 which is not provided with the lateral continuation formed by the part 40. The inner face of part 39 is furthermore provided with a pair of spaced, parallel grooves 50, 51 of less cross sectional area than the grooves 43, 44 and the grooves 50, 51 open into the grooves 43, 44 respectively, centrally of the inner ends of the latter. Formed in the inner face of part 39 is a groove 51′ parallel to and in close proximity to the outer side of groove 51. The part 40 has its inner face formed with a groove 52 of semi-circular cross section provided with spaced ribs 53. The groove 51′ terminates in and centrally of the inner end of the groove 52. The grooves 51, 51′ terminate at that end of the part 39 with which the lateral continuation is formed. The groove 52 is of greater cross sectional area than the groove 51′. The grooves 43, 44 are spaced from the side edges of the part 39. The groove 52 is spaced from the outer side edge of part 40.

The inner face of the part 41 is provided with a pair of spaced, parallel grooves 55, 56 adapted to align with the grooves 43, 44. The grooves 55, 56 are of less length than the part 41 and at their inner ends, centrally thereof, open into grooves 57, 58 which are of less cross sectional area than the grooves 55, 56. The grooves 57, 58 are formed in the inner face of part 41 and the latter is also provided with a groove 57′ parallel to and in close proximity to the outer side of groove 57. The grooves 55, 56 are of less cross sectional area than either of the grooves 43, 44. The grooves 55, 56 are provided with semi-circular, spaced ribs 58′, 59′ respectively, having their free edges provided with notches 61, 62 respectively. The part 42 has its inner face formed with a groove 63 of the same cross sectional area as the groove 56. The groove 57′ opens into the inner end of the groove 63, centrally of such end. The groove 63 is provided with spaced ribs 64. The ribs 53 and 54 perform the same function as the ribs 14 and 27. The grooves 43 and 55, 44 and 56, 52 and 63 coact to receive the insulated terminal portions of the conductors 66. The grooves 50 and 57, 51 and 57′, and 51′ and 58′ coact to receive the non-insulated terminal parts of the conductors 66. The parts 39 and 40 are provided with openings for the passage of a headed bolt 67 carrying a securing nut 68 for the purpose of clamping the plates 37, 38 together.

The form illustrated in Figures 3 and 4 is the same as that shown with respect to Figures 1 and 2 with this exception that in lieu of providing the wide part of each of the plates with a single wide groove and a single narrow groove, it is formed with a pair of wide grooves provided with ribs and three small grooves.

The form illustrated in Figures 5 and 6 is the same as that shown in Figures 1 and 2, with this exception that the plates are reversed with respect to the position of the plates shown in Figure 1. In Figures 5 and 6 the apertured, grooved plates are generally indicated at 69 and 70, the conductors to which the plates are clamped at 71 and 72, the coacting grooves in the plates 69 and 70 at 73, 74 and 75.

The connecter shown in Figures 7 and 8 is intended for connecting wires and cables to the rails of electric railways and the apertured, grooved plates thereof are generally indicated at 76, 77 and are constructed substantially in the same manner as the plates 1 and 2, with this exception that the plate 77 is provided with a slightly tapered extension or plug 78 which is driven tight in an appropriate hole drilled in the rail to establish a good contact. The clamping means for the forms shown in Figures 5 and 7 are indicated generally at 81 and 82 respectively.

As will be understood, as suggested herein, there may be slight changes made in the construction and arrangement of the details of this invention without departing from the field and scope of the same, and we intend to include all such variations, as fall within the scope of the appended claims in this application in which the preferred and most used forms of this invention have been disclosed.

We claim:—

1. In a connecter for connecting electric insulated cables and the like to a rail-way-rail, the combination of a base-plate; a top plate; means for clamping said plates together, said plates having registering grooves provided with portions for engaging the cores and with other portions for engaging the insulation of said cables, and a tapered extension positioned on one of said plates and adapted to be driven for frictional engagement into said rail.

2. An electrical connecter comprising a pair of opposed plates formed of conducting material, each of said plates having a wide part and a narrow part, the latter forming a lateral continuation of a portion of one side of the former, the wide and narrow parts of one plate being of greater width than such parts of the other plate, the inner face of the narrow part of each plate provided with a lengthwise groove, the outer side of the wall of the groove in one narrow part merging into the outer lengthwise edge of such part, the outer side wall of the groove in the other narrow part being spaced from the outer longitudinal edge of such part, said grooves coacting to receive an electrical conductor, the inner face of the wide part of each plate provided with a lengthwise groove, the groove in one wide part formed in a lengthwise marginal portion and having its wall merging into a longitudinal edge of such part, the groove in the other wide part having the outer side of its wall spaced from the longitudinal edge of such part, said grooves in said wide parts coacting to receive an electrical conductor, and means extending centrally through said wide parts for clamping the plates against said conductors.

3. An electrical connecter comprising a pair of opposed plates formed of conducting material, each of said plates having a wide and a narrow part, each narrow part forming a lateral continuation of the side of a wide part, each wide part having its inner face formed with a pair of spaced grooves, one of the grooves in the inner face of each wide part being of less width and depth than the other groove in such face, the said narrow grooves coacting to have the walls thereof encompass the non-insulated portion of an electrical conductor, each of said narrow parts having its inner face provided with a groove of greater width and depth than that of each of the said grooves of less width, the walls of said grooves in the inner faces of said narrow parts coacting to encompass the insulated portion of said conductor, said grooves in the inner faces of said narrow parts having the inner ends centrally thereof merging into one end of the said grooves of less width, the walls of said grooves of greater width in said wide parts coacting to encompass an electrical conductor, and means carried by said wide parts for clamping the walls of said grooves against said conductors.

In testimony whereof, we affix our signatures hereto.

HENRY LAMB STANTON.
ARCHIBALD McBRIDE CRAWFORD.